United States Patent
Fodor et al.

(10) Patent No.: US 10,967,383 B2
(45) Date of Patent: Apr. 6, 2021

(54) METHOD AND DEVICE FOR DETACHING AN ADHERING CHARGE FROM THE INNER SIDE OF A GRINDING PIPE OF A TUBE MILL

(71) Applicant: SIEMENS AKTIENGESELLSCHAFT, Munich (DE)

(72) Inventors: Dan Niculae Fodor, Leinburg-Entenberg (DE); Andreas Procksch, Nuremberg (DE); Kurt Tischler, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/644,822

(22) PCT Filed: Aug. 22, 2018

(86) PCT No.: PCT/EP2018/072663
§ 371 (c)(1),
(2) Date: Mar. 5, 2020

(87) PCT Pub. No.: WO2019/048233
PCT Pub. Date: Mar. 14, 2019

(65) Prior Publication Data
US 2020/0376496 A1    Dec. 3, 2020

(30) Foreign Application Priority Data
Sep. 6, 2017   (EP) ..................... 17189594

(51) Int. Cl.
*B02C 17/18* (2006.01)
*B02C 17/04* (2006.01)
*H02P 6/18* (2016.01)

(52) U.S. Cl.
CPC .......... *B02C 17/1805* (2013.01); *B02C 17/04* (2013.01); *H02P 6/183* (2013.01); *G05B 2219/41368* (2013.01)

(58) Field of Classification Search
CPC ..... B20C 17/00; B20C 17/04; B20C 17/1805; B20C 17/24; H02P 6/183; G05B 2219/41368
See application file for complete search history.

(56) References Cited

U.S. PATENT DOCUMENTS 8,020,792 B2 *   9/2011  Theberge ............ B02C 17/1805
                                                        241/30
10,543,490 B2 *  1/2020  Boehnlein .......... B02C 17/1805
(Continued)

FOREIGN PATENT DOCUMENTS

CN   106824397 A   6/2017
DE   3528409 A1   2/1987
(Continued)

OTHER PUBLICATIONS

PCT International Examination Report and Written Opinion of International Examination Authority dated Dec. 13, 2018 corresponding to PCT International Application No. PCT/EP2018/072663 filed Aug. 22, 2018.

*Primary Examiner* — Shelley M Self
*Assistant Examiner* — Katie L. Parr
(74) *Attorney, Agent, or Firm* — Henry M. Feiereisen LLC (57) ABSTRACT

In a method for detaching a frozen charge from an inner wall of a grinding tube of a tube mill, a motor of a drive system is operated in a first mode to rotate the grinding tube for grinding. In a second mode, the motor of the drive system is operated to remove the frozen charge from the inner wall of the grinding tube such that operation of the motor to effect a rotational movement of the grinding tube is repeatedly (Continued)

disturbed by a disturbance signal to cause a repeated disturbance within a variable time interval, with the time interval of the repeated disturbance being shortened.

15 Claims, 5 Drawing Sheets

(56) References Cited

U.S. PATENT DOCUMENTS

| | | | | |
|---|---|---|---|---|
| 2002/0175232 | A1* | 11/2002 | Scuccato | B02C 17/1805 |
| | | | | 241/30 |
| 2003/0052205 | A1 | 3/2003 | Tirschler | |
| 2008/0169368 | A1* | 7/2008 | Becker | B02C 17/24 |
| | | | | 241/30 |
| 2013/0001338 | A1* | 1/2013 | Keller | B02C 17/24 |
| | | | | 241/30 |
| 2013/0327859 | A1* | 12/2013 | Holland | B02C 25/00 |
| | | | | 241/30 |

FOREIGN PATENT DOCUMENTS

| | | |
|---|---|---|
| EP | 2363724 B1 | 10/2013 |
| GB | 970897 A | 9/1964 |
| GB | 1261308 A | 1/1972 |
| WO | WO 2011089067 A1 | 7/2011 |

* cited by examiner

METHOD AND DEVICE FOR DETACHING AN ADHERING CHARGE FROM THE INNER SIDE OF A GRINDING PIPE OF A TUBE MILL

CROSS-REFERENCES TO RELATED APPLICATIONS

This application is the U.S. National Stage of international Application No. PCT/EP2018/072663, filed Aug. 22, 2018, which designated the United States and has been published as International Publication No. WO 2019/048233 A1 and which claims the priority of European Patent Application, Serial No. 17189594.9, filed Sep. 6, 2017, pursuant to 35 U.S.C. 119(a)-(d).

BACKGROUND OF THE INVENTION

The invention relates to a method and a device for detaching a frozen charge from the inside of a grinding tube of a tube mill. The invention further relates to a tube mill.

Tube mills are preferably used to grind materials such as ores. It is not unusual for the operation of a tube mill to be interrupted for an extended period of time. The tube mill is at a standstill during this time. While the tube mill is at a standstill, material present in the grinding tube of the tube mill may solidify and stick firmly to the inner wall of the grinding tube. Such cemented, solidified material is referred to as a locked or "frozen" charge.

If the tube mill is re-started after a lengthy period of inactivity, there is a risk that the frozen charge will become detached from the grinding tube at a great height (e.g. after half a revolution or after a rotation of about Phi=160° of the grinding tube) and fall down causing considerable damage to the tube mill when it then hits the inside of the grinding tube.

There are therefore devices for detecting the presence of the frozen charge, as described in DE 35 28 409 A1.

SUMMARY OF THE INVENTION

EP 2 353 724 B1 proposes a method for releasing a frozen charge from the inner wall of a grinding tube, wherein the grinding tube is braked abruptly at least once at a predefined angle of rotation.

The object of the invention is to operate tube mills without damage being caused by a frozen charge.

According to one aspect of the invention the object is achieved by a method for detaching a frozen charge from the inner wall of a grinding tube of a tube mill, wherein a drive device is used to detach the frozen charge and to move the grinding tube, wherein the drive device includes two operating modes, wherein, in the first operating mode, the drive system rotates the grinding tube for grinding, wherein, the second operating mode, the drive system removes the frozen charge from the inner wall of the vessel, wherein in the second operating mode, a motor of the drive system is repeatedly disturbed in its rotational movement a repeated disturbance, wherein the disturbance occurs with a variable time interval, wherein the time interval of the repeated disturbance is shortened.

According to another aspect of the invention, the object is achieved by a device for releasing a frozen charge from the inside of a grinding tube of a tube mill, including a motor and a controller, optionally a frequency converter, wherein the motor is designed to rotate the grinding tube, wherein the device is desired to carry out a method as set forth above.

According to still another aspect of the invention, the object is achieved by a tube mill for processing a base material, including a device as set forth above.

To detach the frozen charge from the inner wall, it is proposed to apply a disturbance, e.g. in the form of a vibration, to the rotational movement of the grinding tube. A motor current is provided to move the vessel.

In other words, a disturbance, in particular one adapted to suit the component structure, in particular a vibration, shall be impressed on the motor current. The disturbance can be any frequency, it can be both harmonic and inharmonic and both periodic and non-periodic. The disturbance can also be applied as an impact.

The disturbance preferably takes place until the frozen charge has detached from the inner wall of the vessel.

The disturbance can take the form of a periodic or non-periodic vibration, caused by repeated impulses, repeated abrupt deceleration of the rotational movement and/or repeated impulses in the direction of rotation or perpendicular to the surface of the vessel. The impulses are preferably designed as abrupt increases in torque and/or speed. In particular mechanical disturbances, e.g. Impulses on the surface of the vessel, are preferably imparted to the vessel using a mechanical disturbing element or a mechanical excitation unit.

A repeated disturbance can advantageously be produced by mechanical action on the vessel and thus on the (frozen) charge.

The mechanical disturbance can be produced by a shaker, wherein the shaker is preferably directly connected to the vessel. The mechanical action on the vessel or on another element of the industrial system takes place by means of a disturbing element. The disturbing element is preferably linked to a controller, wherein the controller causes the disturbing element to perform the repeated mechanical disturbance, in particular when a frozen charge is present. The disturbing element can be designed as a hydraulic cylinder having an actuator which, when deployed, transmits an impulse to the vessel.

In particular by means of the frequency converter, the disturbance is imparted by means of a disturbance signal which is applied to a motor current. The motor current is usually a three-phase alternating current.

The basis for the three-phase alternating current is a three-phase AC voltage. A disturbance can therefore be a disturbance voltage that is added to the three-phase AC voltage. For simplicity's sake, only the motor current and a disturbance current will be referred to in the following.

The use of the invention is not limited to a tube mill, but can also be applied to other devices in the field of mining or heavy industry. In addition, the invention can be applied to a vertical mill.

Common to the abovementioned examples of applications of the invention is that a surface having a frozen charge can be freed from the frozen charge by the invention. Particularly in the case of a hopper, a mechanical disturbing element is preferred for imparting a repeated (mechanical) disturbance. For the sake of clarity, the invention will be described below on the basis of a tube mill having a tube. However, the invention is also suitable for another industrial plant for processing a base material, e.g. for the dressing of ore or rock.

In one possible method for detaching a frozen charge from the inner wall of a grinding tube of a tube mill, a drive device is used for detaching the frozen charge and moving the grinding tube, wherein the drive device comprises two operating modes, wherein in the first operating mode the drive system executes the rotational movement of the grinding tube for grinding, wherein in the second operating mode the drive system detaches the frozen charge from the inner wall of the vessel, wherein in the second operating mode a motor of the drive system is repeatedly interrupted in its rotational movement by a repetitive disturbance.

After the tube mill has started, the drive device can initially be run in the second operating mode. Particularly after a frozen charge has been detected, the second operating mode is used to prepare a safe first operating mode.

The (rotational) movement is generally understood to mean a rotation of the grinding tube. The rotation is preferably carried out at a constant rotational speed. When a disturbance occurs, the rotational speed of the grinding tube is preferably varied over time.

In the first operating mode, the grinding tube usually rotates about its axis of rotation without rotational acceleration.

The repeated disturbance is a deviation from a uniform rotational movement or a uniform acceleration movement. The repeated disturbance can be characterized by an acceleration that is not constant over time.

The rotational movement is preferably disturbed by a disturbance signal impressed on the motor current.

The method described above provides a particularly simple means of detaching a frozen charge.

In an advantageous embodiment of the invention, the disturbance signal results in a repeated jerky movement of the grinding tube.

The disturbance signal is preferably implemented as a brief increase in the voltage and/or the motor current. The disturbance signal can also be an alternating current, wherein the frequency of the alternating current is different from the frequency of the three-phase motor current.

The use of a disturbance signal which is impressed on the motor current allows very simple modulation of the rotational movement of the grinding tube. A frozen charge in a grinding tube can therefore be released in a simple and uncomplicated manner.

In another advantageous embodiment of the invention, the disturbance signal is periodic.

A periodic disturbance signal is either a sinusoidal signal or a regularly repeated current rise and/or a regularly repeated current drop.

A periodically repeated disturbance can be used to free the inside of the grinding tube from a frozen charge in a particularly careful manner.

In a further advantageous embodiment of the invention, the disturbance is modulated onto the movement until a settable point in time.

It usually takes between one minute and about 30 minutes to remove a frozen charge from the grinding tube. It therefore makes sense for the drive device to independently switch to the first operating state after this period of time if no frozen charge is detected.

To increase operational safety still further, the transition between the operating states preferably only takes place if no frozen charge can be found.

This provides simplified operation of the tube mill.

In another advantageous embodiment of the invention, the disturbance occurs with a variable time interval t.

The time period between the individual disturbance signals preferably decreases with time, so that the time interval of the repeated disturbance is shortened.

This provides protection for the grinding tube and the drive system of the tube mill.

The disturbance is preferably caused by torque shocks which are imparted to the rotational movement of the grinding tube by the respective disturbance signal.

In a further advantageous embodiment of the invention, the disturbance increases in amplitude.

The second operating phase preferably starts with a low amplitude. The amplitude then increases to a maximum amplitude in the second operating phase and then remains at the maximum amplitude or decreases again. The amplitude can be increased by changing the disturbance voltage or the disturbance current.

Since it is often initially unclear how strong a disturbance must be in order to remove the frozen charge from the inner wall of the grinding tube, an increase in the amplitude of the disturbance over time is advantageous. An increase in the amplitude advantageously serves to protect the grinding tube and/or the drive system.

In another advantageous embodiment of the invention, the disturbance modulates the rotational movement of the grinding tube or modulates the torque acting on the grinding tube.

Both the rotational speed and the torque can be controlled by the disturbance signal.

A disturbance of the torque as well as a disturbance of the rotational speed preferably results in particularly precisely adjustable operation of a tube mill, in particular in the second operating mode.

In another advantageous embodiment of the invention, the disturbance is modulated onto the motor of the drive by an additional voltage or by an additional current.

The repeated disturbance to the rotational speed or the torque is possible in a particularly simple manner.

An additional current or an additional voltage is impressed on the motor current or the motor voltage.

The additional current or the additional voltage is preferably provided by means of the frequency converter.

The additional motor current is preferably impressed sinusoidally. The modulation of a three-phase alternating current with another oscillating voltage produces a particularly simple and effective disturbance of the rotation of the grinding tube.

The additional disturbance current or the additional disturbance voltage can preferably be impressed on the motor current or motor voltage by switching off a filter in the frequency converter.

Impressing an additional voltage or an additional current, in particular a sinusoidal voltage or a sinusoidal current, provides a particularly simple means of removing a frozen charge.

In a further advantageous embodiment of the invention, the repeated disturbance is caused by mechanical action on the grinding tube.

The mechanical disturbance is preferably provided by a mechanical disturbing element. The disturbing element can be powered hydraulically or electrically. The mechanical disturbance is preferably caused by an impulse applied to the grinding tube. The mechanical disturbance can also be caused by an abrupt increase in the torque. The respective impulse can be applied in a direction tangential to the rotational movement of the grinding tube, e.g. onto an attachment of the grinding tube. The mechanical disturbance, in particular the respective impulse, can also be directed toward or away from the axis of rotation. The mechanical disturbance, in particular the respective impulse, is preferably targeted directly at the (frozen) charge, so that the mechanical disturbance acts directly on the charge and releases it from the inside of the grinding tube by mechanical action.

A combination of the mechanical action on the grinding tube and a repeated disturbance produced by the drive is also possible.

The use of a mechanical disturbance advantageously provides a direct means of releasing the frozen charge from the inside of the grinding tube.

In another advantageous embodiment of the invention, the mechanical disturbance is produced by the disturbing element instead of using the motor to impart the repeated disturbance.

By completely replacing the drive-side disturbance, the invention can also be applied to other components of a system.

In a further advantageous embodiment of the invention, the disturbance is modulated up to a predetermined maximum angle of rotation.

Limiting the angle of rotation in the second operating mode ensures that a suddenly detaching frozen charge causes no damage to the grinding tube. A maximum angle of rotation of approximately +/−150° is advantageously suitable for protecting the grinding tube.

In another advantageous embodiment of the invention, the movement is disturbed only when a frozen charge is detected in the grinding tube.

A frozen charge can be determined by the function of the torque from the angle of rotation of the grinding tube. Thus, when a frozen charge is detected, the drive system of the tube mill can change to the second operating state.

It is advantageous to adapt the repeated disturbance to suit the mechanical properties of the tube mill or the drive system.

The repeated disturbance is preferably adapted to suit the type of charge of the tube mill and/or the quantity of charge present in the grinding tube.

These two adaptations enable a frozen charge to be detached in a particularly effective manner.

For the device for releasing a frozen charge from a grinding tube, the device comprises a motor and a controller and optionally a frequency converter, wherein the motor is designed to rotate the grinding tube, characterized in that the device is designed to carry out a method described here.

In a further advantageous embodiment of the invention, the device has a detection device for detecting the frozen charge.

The detection device is used to detect whether a frozen charge is present in the tube mill, in particular on the inside of the grinding tube. The detection device is preferably assigned to the frequency converter or the controller. The detection device can determine the necessary torque which is required to rotate the grinding tube from the starting position. If a certain torque is exceeded, a frozen charge can be assumed to be present. In this case the frozen charge is detached using the second operating mode of the tube mill.

As a charge is not baked on or stuck to the inside of the grinding tube every time a tube mill starts up, this arrangement provides significant protection for the drive system of the tube mill.

In another advantageous embodiment of the invention, the device has a mechanical brake.

The mechanical brake provides an effective means of assisting the disturbance of the rotational movement. Thus, a repeated disturbance signal can accelerate the rotation of the grinding tube and the mechanical brake decelerate it again.

The mechanical brake thus increases the service life of the drive system.

In a further advantageous embodiment of the invention, the motor is designed as a segment motor.

A segment motor provides particularly gentle and low-maintenance operation of the tube mill. Both the stator and the rotor are preferably designed as a segment motor.

In another advantageous embodiment of the invention, the motor drives the grinding tube via a gearbox.

The use of a gearbox allows the use of smaller drives for a tube mill. In addition, a particularly high torque can be applied to the tube mill. Moreover, this solution incorporating a gearbox is particularly inexpensive.

The device thus has a gearbox, wherein the gearbox is disposed between the motor and the grinding tube.

The gearbox can be assigned to the motor and/or the grinding tube.

An industrial system, in particular a tube mill, preferably has such a device.

Such a system is to be understood in particular as meaning a tube mill for grinding rock and ore. However, the invention can also be applied to other systems in the processing industry.

The disturbance voltage or the disturbance current is preferably impressed on the motor voltage or the motor current in such a way that one of the resonances of the grinding tube is excited in each case. For example, a resonance frequency is determined for this purpose and this resonance is excited with the repeated disturbance in each case. A shift in the resonance frequency can also be used to determine whether a frozen charge is present.

BRIEF DESCRIPTION OF THE DRAWING

The invention will now be described and explained in further detail below with reference to the accompanying drawings in which.

DETAILED DESCRIPTION OF PREFERRED EMBODIMENTS

Figure 1:
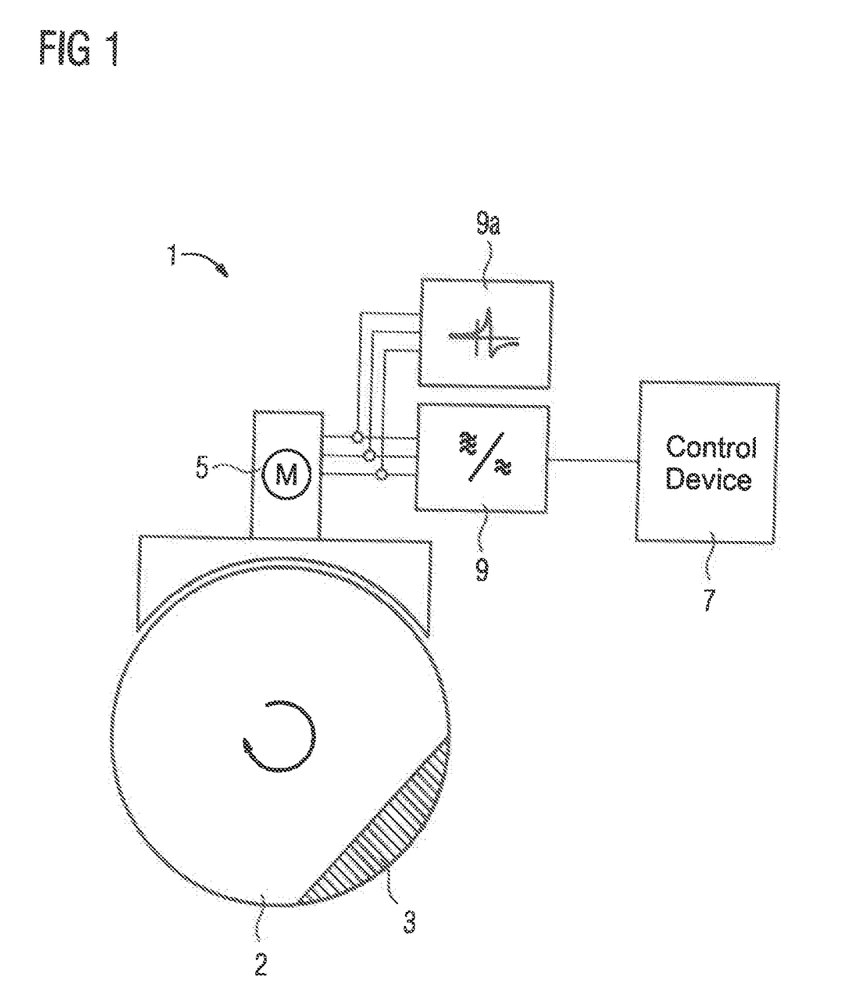
FIG. 1 shows a tube mill having a drive system.

FIG. 1 shows a tube mill 1 having a drive system. The tube mill 1 comprises a grinding tube 2, wherein the grinding tube 2 contains a charge 3. The grinding tube 2 and the charge 3 are rotated by a motor 5. The motor 5 is supplied with current or voltage by a converter 9. The converter 9 is connected to a controller 7. The controller 7 is used to control the movement of the grinding tube 2 of the tube mill 1. By means of the converter 9, the controller 7 is used to repeatedly disturb the rotation of the grinding tube 2 of the tube mill 1. Optionally, a disturbance device 9a can also modulate the motor current I of the motor 5 by means of a disturbance voltage ΔU or a disturbance current ΔI. The motor 5 is preferably a segment motor, only one segment of the motor 5 being shown schematically here. Alternatively, a conventional motor 5 can also be used with the aid of a torque converter for rotating the grinding tube.

The converter 9 is optionally used to determine whether the charge 3 is "frozen" to the inside of the grinding tube 2. For this purpose, the motor current I is determined and compared with a specified motor current.

Figure 2:
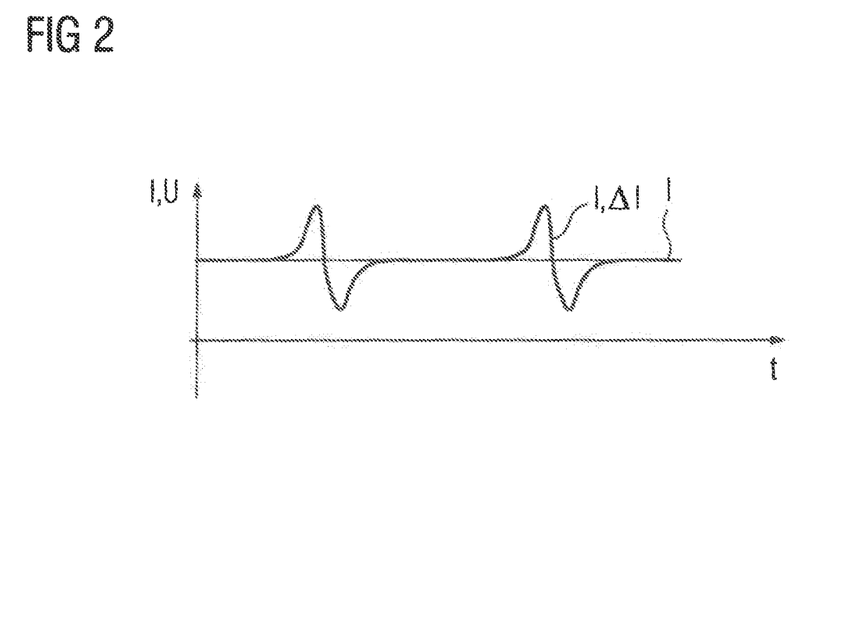
FIG. 2 shows a voltage or a current as a function of time.

FIG. 2 shows the voltage or current as a function of time t. A motor current I for the motor 5 is shown as a function of time t. For clarity, the drive current I is shown as a straight line. A disturbance current ΔI is modulated onto or impressed on the motor current I. The modulation of the motor current I with the disturbance current ΔI can take place in different ways and can be either periodic or non-periodic.

Figure 3:
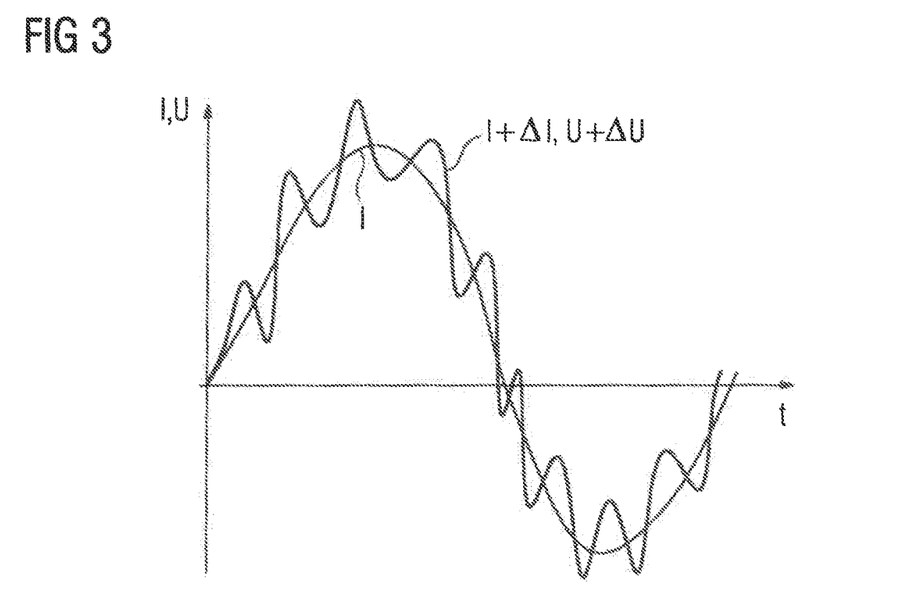
FIG. 3 shows a modulation of the current or the voltage.

FIG. 3 shows modulation of the current I or a voltage U with a disturbance voltage ΔU and a disturbance current ΔI as a function of time t. The motor current I is shown as a sinusoidal section. The disturbance current ΔI is modulated onto or impressed on the sinusoidal motor current I so that a motor current I with a higher-frequency disturbance is supplied to the motor 5. The disturbance current ΔI or disturbance voltage ΔU is used to disturb the movement of the motor 5 and thus to disturb the movement of the grinding tube 2.

Figure 4:
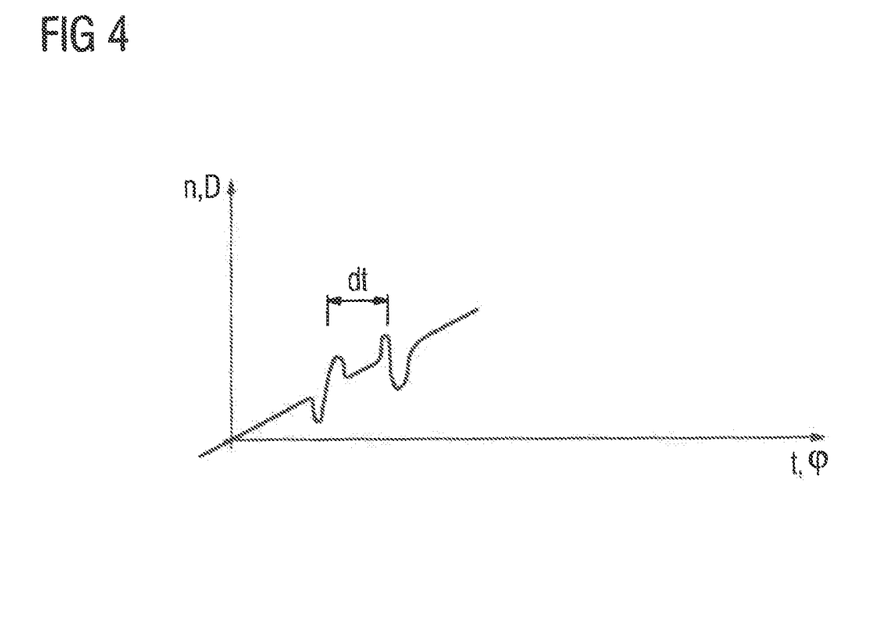
FIGS. 4 to 6 show different disturbances.
Figure 5:
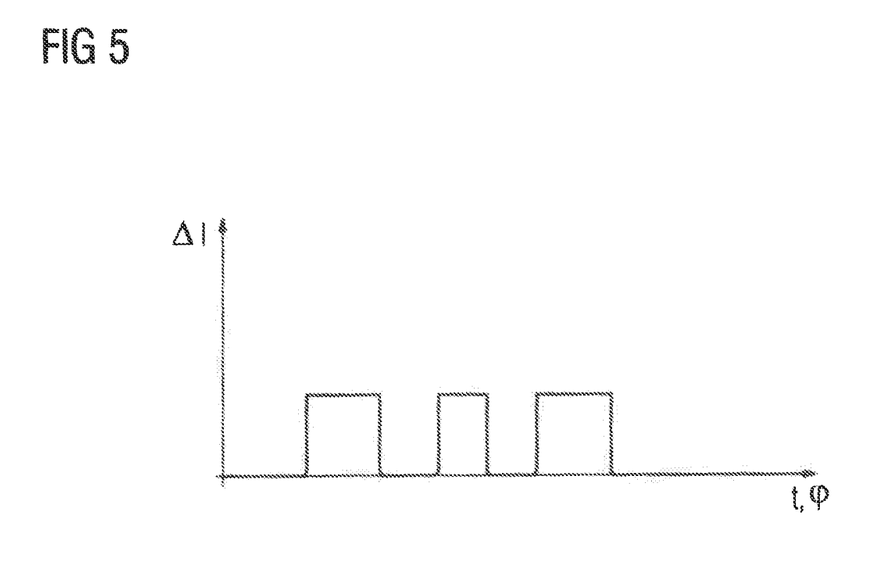
Figure 6:
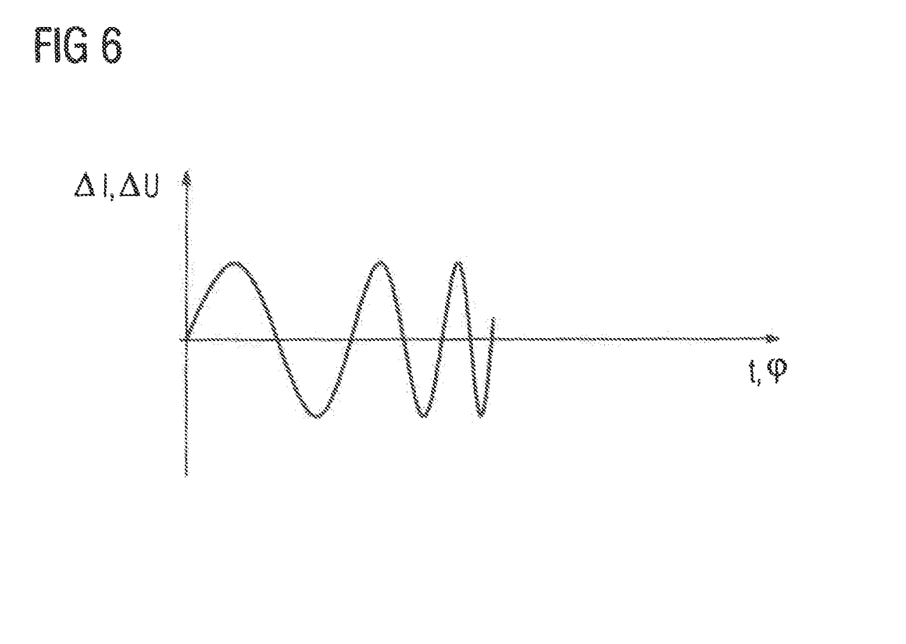

FIGS. 4, 5 and 6 show different disturbances. The disturbances shown in each case result from the disturbance currents ΔI and disturbance voltages ΔU shown in FIGS. 4 to 6.

FIG. 4 shows a disturbance of a rotational speed n or torque D as a function of time t or of an angle of rotation φ of the grinding tube 2. Initially the speed n or torque D increases linearly. Disturbances are modulated onto the speed n or torque D at a time interval dt.

FIG. 5 shows a disturbance current ΔI as a function of time t or of the angle of rotation φ of the grinding tube 2. The disturbance current ΔI is shown here as an arbitrarily formed square-wave current. The rising edge in each case results from connection of a constant disturbance current ΔI to the motor current I.

FIG. 6 shows a disturbance voltage ΔU or a disturbance current ΔI as a function of time t or of the angle of rotation p. The disturbance voltage ΔU or the disturbance current ΔI is sinusoidal, the period of the disturbance current ΔI or the disturbance voltage ΔU decreasing over time t. The frequency of the disturbance voltage ΔU or disturbance current ΔI therefore increases with time t. Such an increase in the frequency of the disturbance voltage or disturbance current can result in a resonance Res, as shown in FIG. 7.

Figure 7:
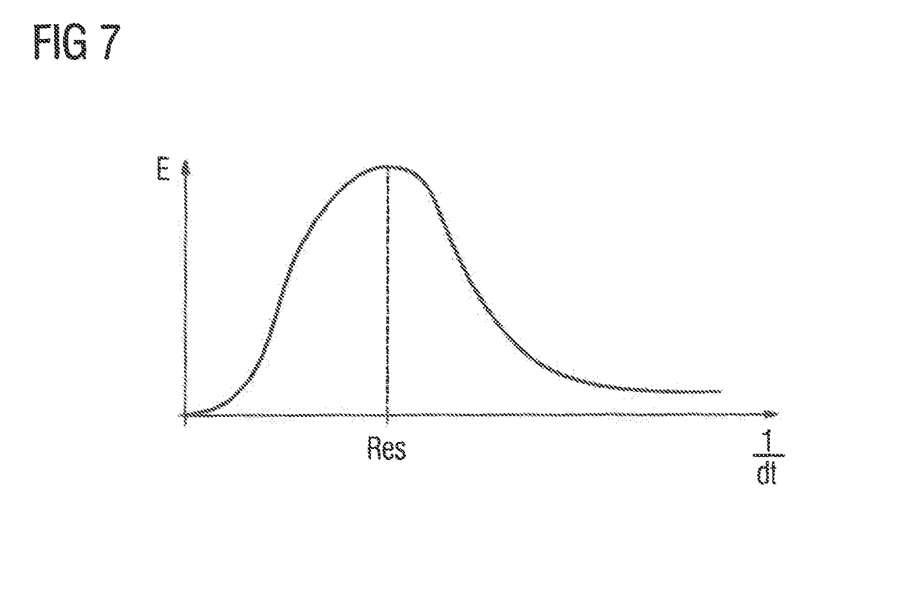
FIG. 7 shows a resonance curve.

FIG. 7 shows the effect E of the disturbance as a function of the inverse time interval of the disturbance. A resonance curve is shown which has a resonance Res approximately in the center of the inverse time interval 1/dt.

Figure 8:
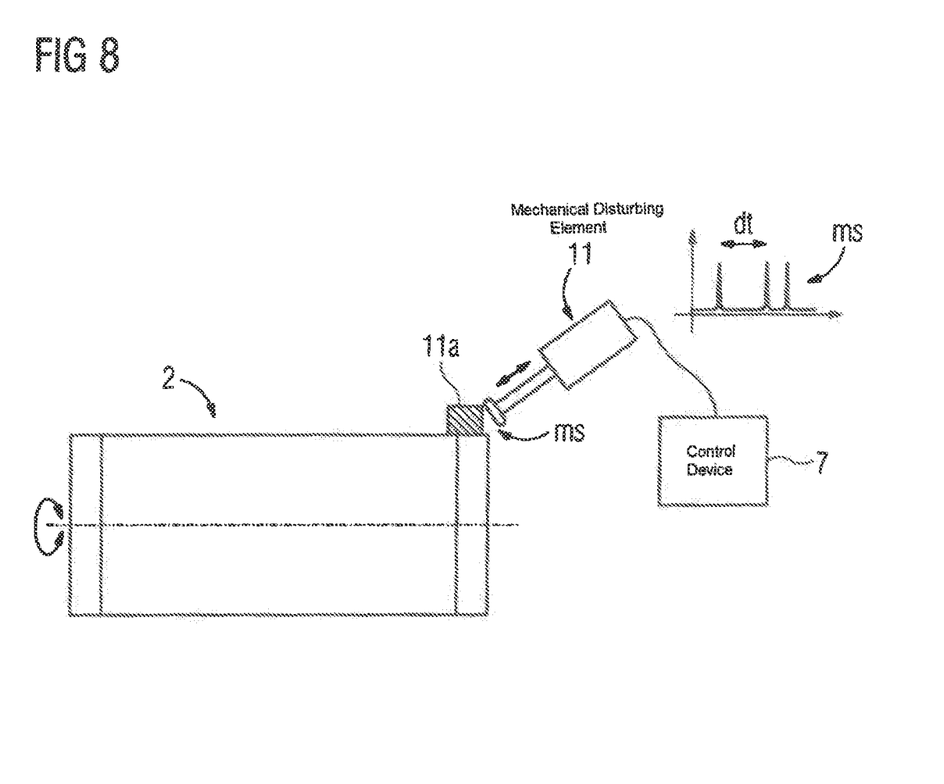
FIG. 8 shows a grinding tube to which a mechanical disturbance is applied.

FIG. 8 shows a grinding tube 2 to which a mechanical disturbance ms is applied. According to this embodiment, the grinding tube 2 has an attachment 11a, the attachment 11a being repeatedly subjected to a mechanical disturbance ms by a mechanical disturbing element 11. The mechanical disturbance ms can be produced by repeated back and forth movement of the mechanical disturbing element 11, as indicated by the arrow alongside the mechanical disturbing element 11.

The mechanical disturbance ms is implemented here as a repeated impulse. The mechanical disturbances ms have a time interval dt.

The mechanical disturbing element 11 is controlled by a controller 7. The controller 7 preferably controls the amplitude and the time interval dt between the mechanical disturbances ms.

In summary, the invention relates to a method and a device for removing a charge 3 adhering to the inner wall of a vessel 2, in particular a grinding tube 2. In order to detach the charge 3, which is also referred to as "frozen charge", the motion is subjected to a repeated disturbance imparted to rotation of the grinding tube 2. The repeated disturbance is preferably produced by a disturbance current ΔI impressed on the motor current I. The disturbance current ΔI is preferably selected on the basis of the type of charge and/or on the basis of the physical characteristics of the tube mill. Removal of the frozen charge 3 is at least significantly simplified by the invention. Optionally or alternatively, the repeated disturbance can also be produced by a mechanical disturbance ms.

What is claimed is:

1. A method for detaching a frozen charge from an inner wall of a grinding tube of a tube mill, said method comprising:
    operating a motor of a drive system in a first mode to rotate the grinding tube for grinding:
    operating the motor of the drive system in a second mode for removing the frozen charge from the inner wall of the grinding tube such that operation of the motor to effect a rotational movement of the grinding tube is repeatedly disturbed by a disturbance signal to cause a repeated disturbance within a variable time interval; and
    shortening the time interval of the repeated disturbance.

2. The method of claim 1, wherein the disturbance signal causes a repeated vibration of the grinding tube.

3. The method of claim 1, wherein the disturbance signal is periodic.

4. The method of claim 1, further comprising modulating the disturbance signal onto the rotational movement up to a settable point in time.

5. The method of claim 1, wherein the disturbance signal increases in amplitude.

6. The method of claim 1, wherein the disturbance signal causes a modulation of the rotational movement of the grinding tube or a modulation of a torque acting on the grinding tube.

7. The method of claim 1, further comprising modulating the disturbance signal by an additional voltage or by an additional current onto the motor of the drive system.

8. The method of claim 1, wherein the repeated disturbance is caused by a mechanical action on the grinding tube.

9. The method of claim 1, further comprising modulating the disturbance signal up to a predetermined maximum angle of rotation starting from a rest position.

10. The method of claim 1, further comprising generating the disturbance signal to repeatedly disturb the rotational movement only when a frozen charge is detected.

11. A device for detaching a frozen charge from an inner wall of a grinding tube of a tube mill, said device comprising:
    a motor configured to operate in a first operating mode in which the motor causes a rotational movement of the grinding tube, and in a second operational mode in which the motor removes the frozen charge from the inner wall of the grinding tube; and
    a controller operably connected to the motor, said controller configured to generate during the second operational mode a disturbance signal to cause a repeated disturbance of the rotational movement of the grinding tube within a variable time interval that is increasingly shortened as the disturbance is repeated.

12. The device of claim 11, further comprising a frequency converter operably connected to the controller to provide the disturbance signal.

13. The device of claim 11, further comprising a mechanical brake interacting with the motor to assist the repeated disturbance of the rotational movement of the grinding tube.

14. The device of claim 11, wherein the motor is embodied as a segment motor.

15. The device of claim 11, further comprising a gearbox disposed between the motor and the grinding tube.

* * * * *

UNITED STATES PATENT AND TRADEMARK OFFICE
CERTIFICATE OF CORRECTION

PATENT NO.         : 10,967,383 B2
APPLICATION NO.    : 16/644822
DATED              : April 6, 2021
INVENTOR(S)        : Dan Niculae Fodor, Andreas Procksch and Kurt Tischler It is certified that error appears in the above-identified patent and that said Letters Patent is hereby corrected as shown below:

On the Title Page

Item (72) Inventors:
Second Inventor's city of residence of Andreas Procksch
Replace "Nuremberg" with correct --Nürnberg--.

Item (30) Foreign Application Priority Data:
Replace "EP 17189594" with the correct --EP 17189594.9--.

Item (56) FOREIGN PATENT DOCUMENTS:
Correct the first listed document to read --EP 2353724 B1--.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*